United States Patent

Beaver

[11] 3,974,680
[45] Aug. 17, 1976

[54] PIPELINE LEAK DETECTOR
[75] Inventor: Ruby C. Beaver, Houston, Tex.
[73] Assignee: Inspection Technology Development, Inc., Houston, Tex.
[22] Filed: May 27, 1975
[21] Appl. No.: 581,099

[52] U.S. Cl............................................. 73/40.5 R
[51] Int. Cl.² ........................................ C01M 3/28
[58] Field of Search.............. 73/40.5 R, 49.1, 49.5; 138/97

[56] References Cited
UNITED STATES PATENTS

| | | | |
|---|---|---|---|
| 3,132,506 | 5/1964 | Pritchett | 73/40.5 R |
| 3,298,399 | 1/1967 | Slade | 138/97 |
| 3,782,172 | 1/1974 | McCarron | 73/40.5 R |
| 3,817,086 | 6/1974 | Dorgebray | 73/40.5 R |

Primary Examiner—Charles A. Ruehl
Assistant Examiner—John S. Appleman
Attorney, Agent, or Firm—Vinson, Elkins, Searls, Connally & Smith

[57] ABSTRACT

A pipeline pig inspection device having a plurality of pressure chambers for detecting pipeline leaks and eliminating erroneous indications of leaks caused by obstructions within the pipeline, significant changes in pipeline diameter, and minor fluid flows through the pig which are not caused by leaks.

17 Claims, 8 Drawing Figures

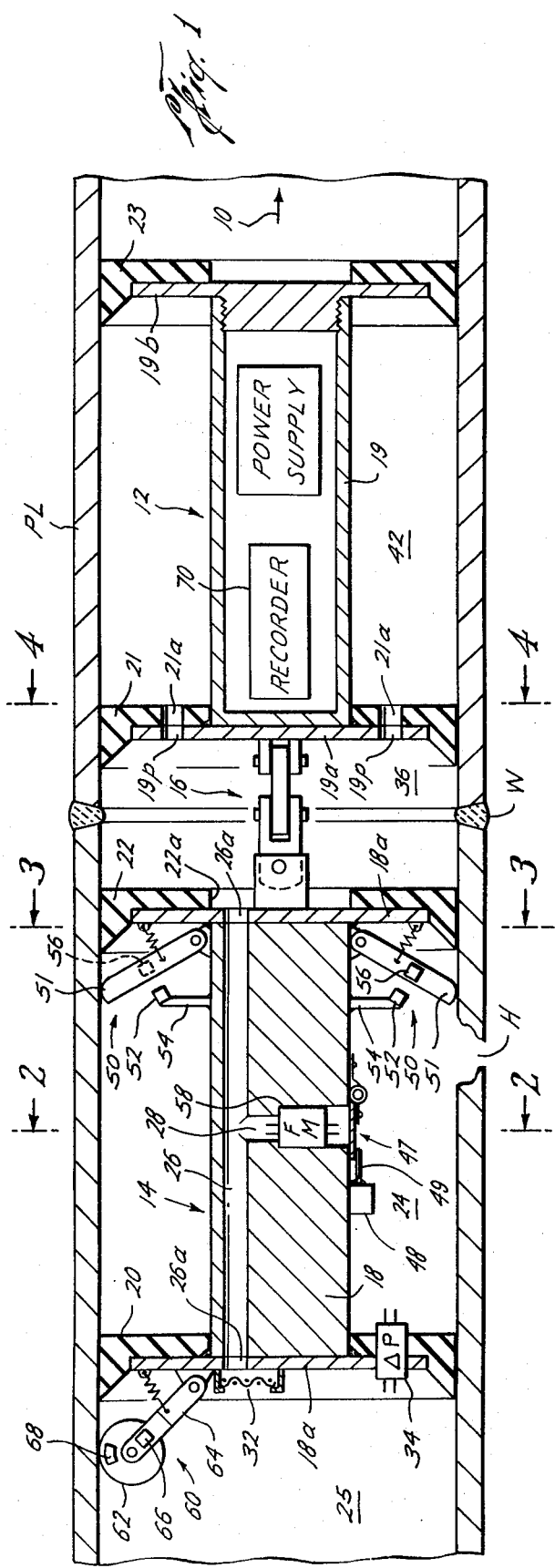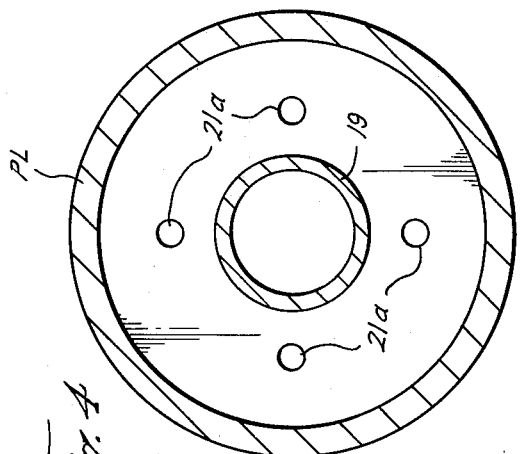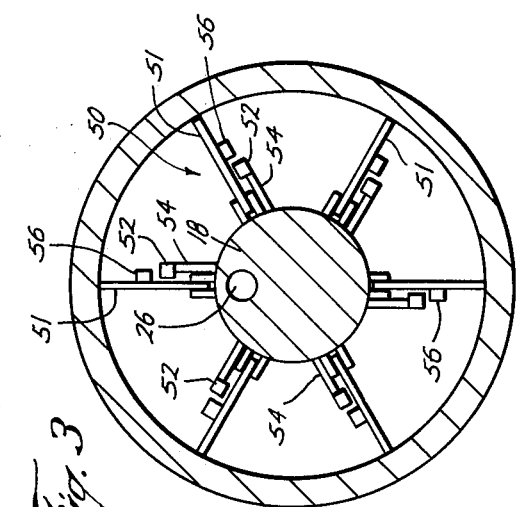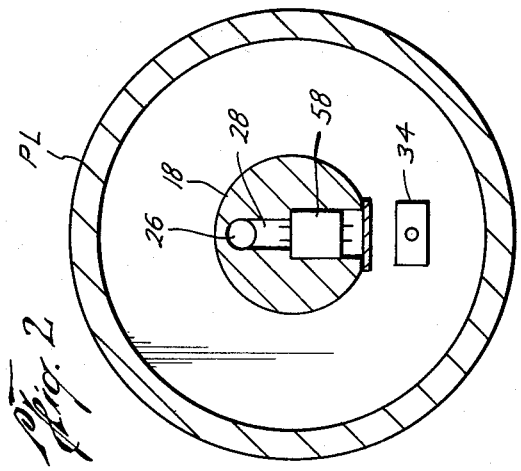

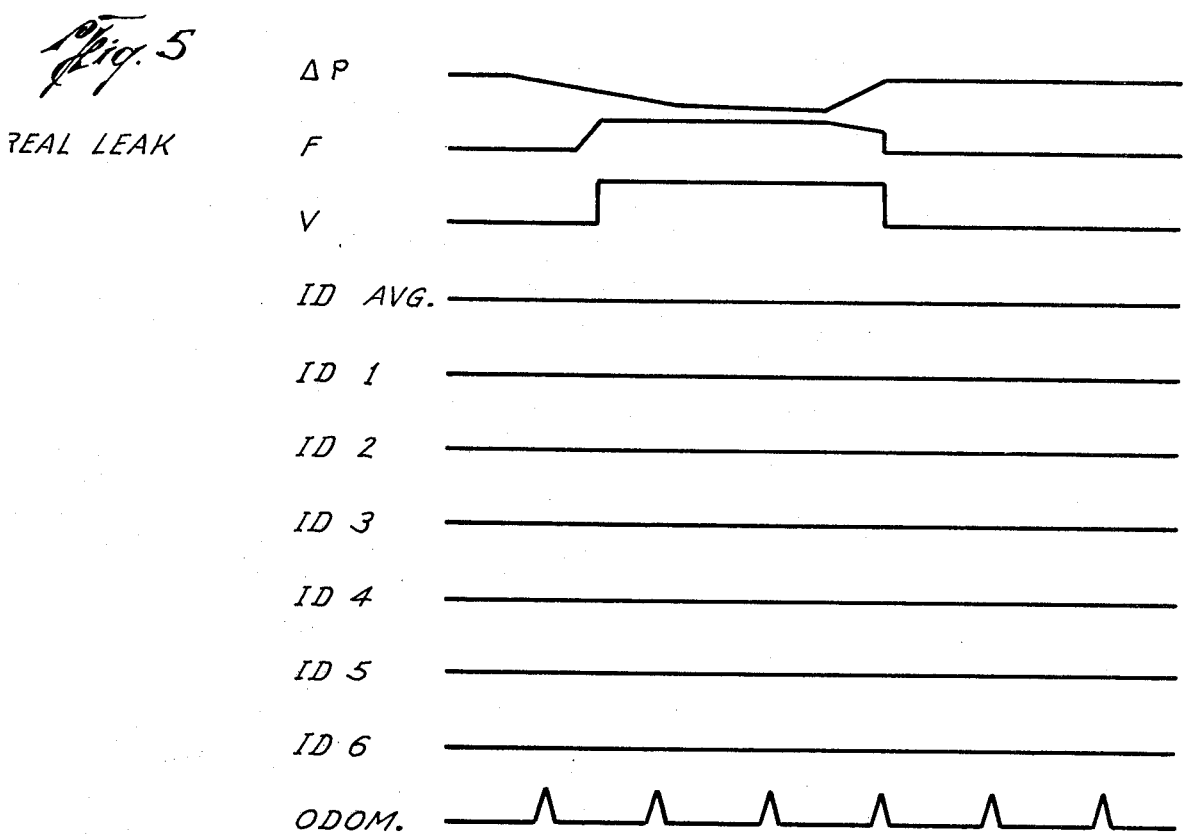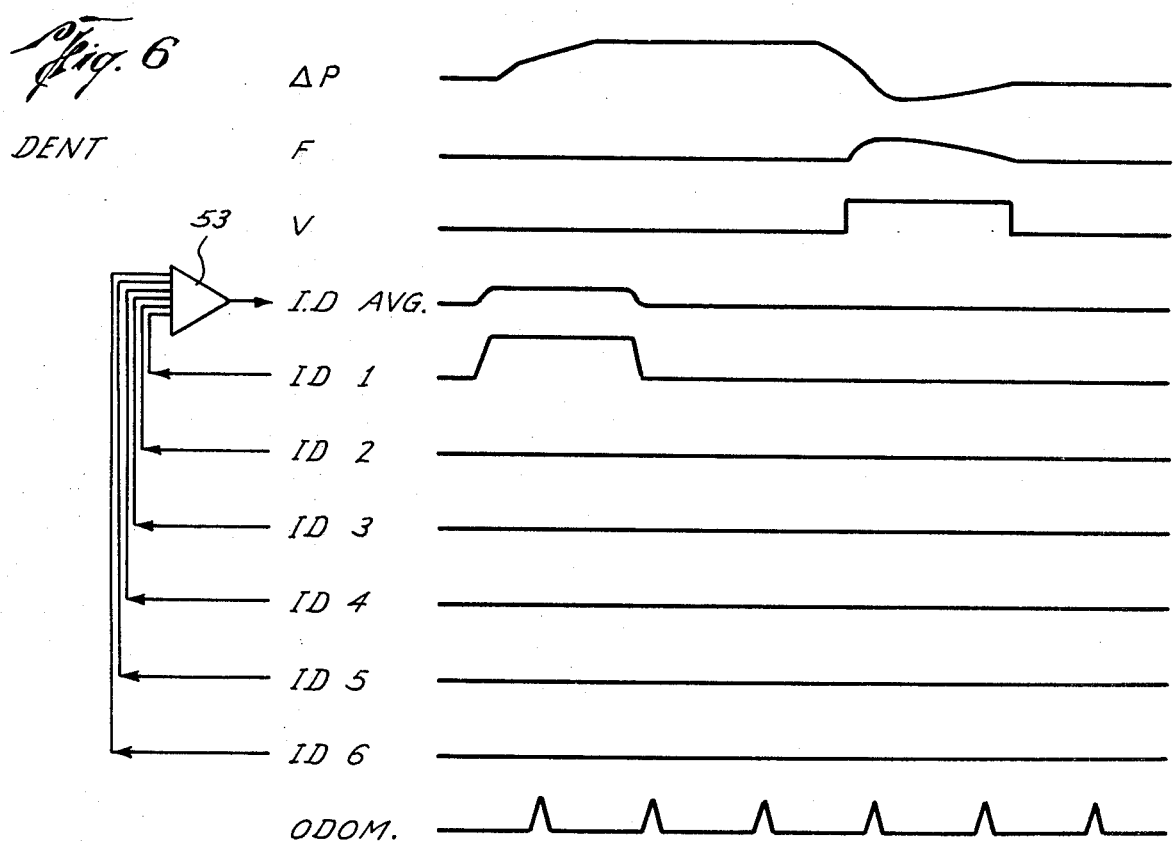

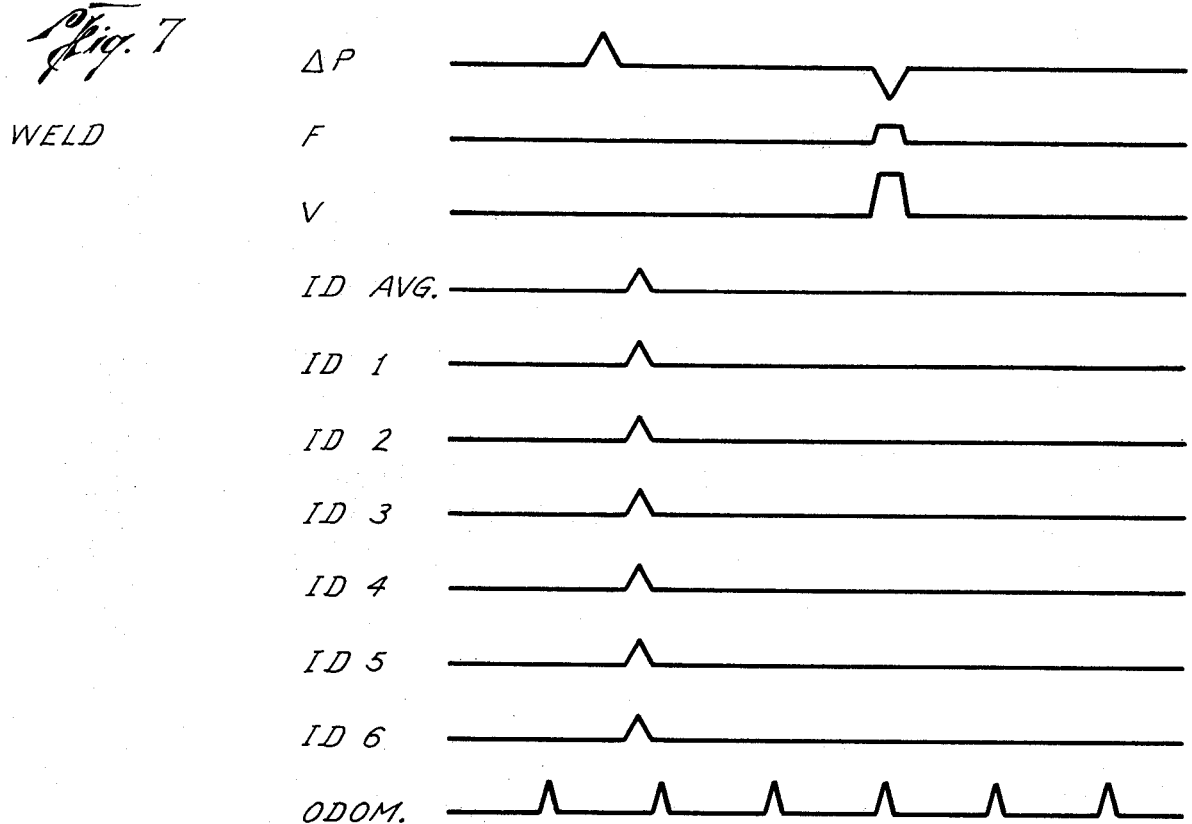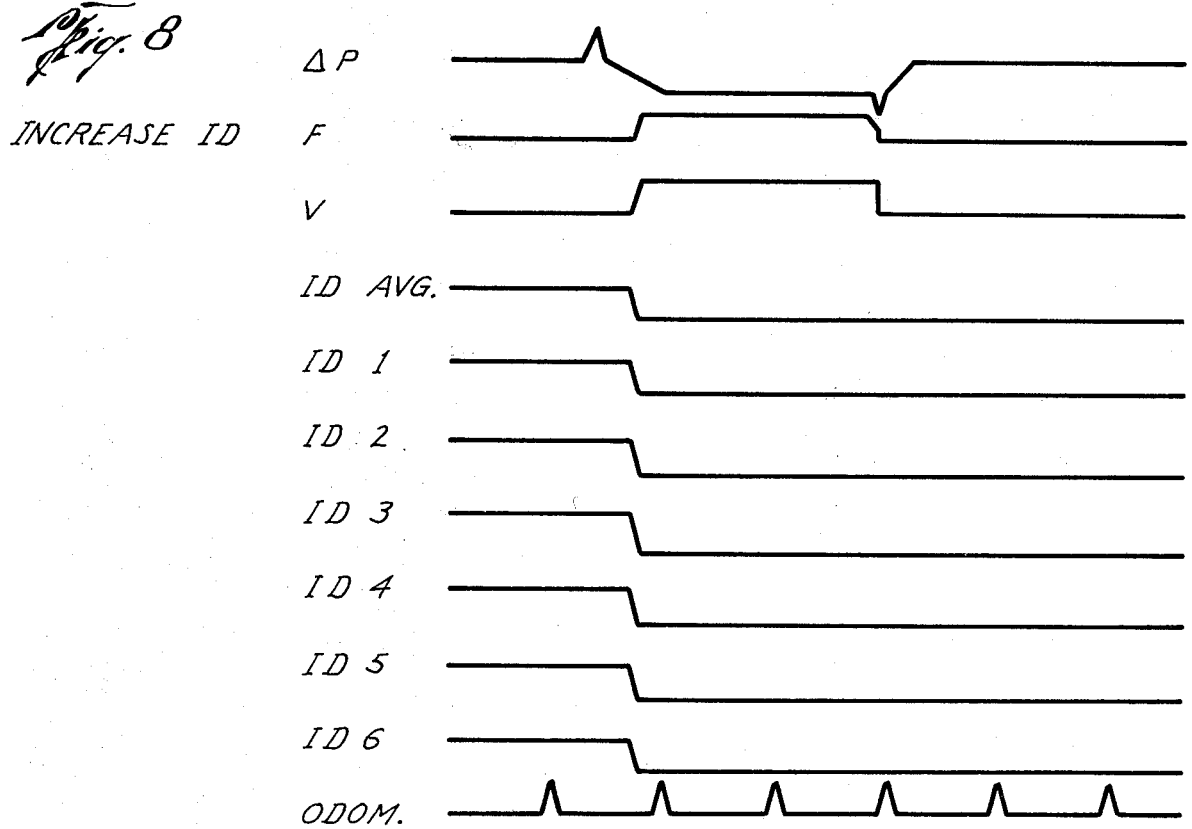

PIPELINE LEAK DETECTOR

BACKGROUND OF THE INVENTION

This invention relates to the inspection of pipeline, and more particularly to the inspection of pipeline for leaks.

The invention relates to inspection apparatus commonly referred to as inspection pigs which are adapted to travel through and inspect buried pipelines which can transmit petroleum products and other fluids. These inspection pigs provide information regarding the presence of pipeline leaks which can lead to explosions that may destroy property and take human lives without the necessity for the expensive operation of unearthing the pipeline.

Inspection pigs typically are propelled through a pipeline by the pressure of fluids therein and travel through a pipeline without substantially disrupting its operation. These pigs usually comprise a plurality of annular cups which engage the inner wall of the pipeline against which pipeline fluids act to propel the pig. The inspection of pipeline by pigs which measure the pressure differential between a test chamber defined by the flexible annular cups and a region in the pipeline outside the test chamber is old and well known in the prior art. For example, see U.S. Pat. Nos. 3,782,172 to McCarron (1974), 3,817,086 to Dorgebray (1974), 3,016,733 to Dean et al. (1962), and 3,196,686 to Cole (1965).

One problem which arises in many of the prior art pigs is that when the flexible cups pass over obstructions in the pipeline, such as welds, pressure changes and fluid flows are experienced which may be interpreted erroneously as caused by leaks.

A second problem with prior art devices has been that substantial changes in the pipeline diameter such as those caused by dents, have tended to cause pressure differentials and fluid flows which have been interpreted as leaks.

Another problem in the prior art has been that small flows of fluid through passages in the pig which are normal during the inspection process but not caused by leaks have made recognizing true pipeline leaks more difficult.

SUMMARY

Applicant solves the problem of eliminating erroneous indications of leads caused by obstructions within the pipeline by providing a plurality of adjacent pressure chambers within the inspection pig. Flexible cups or other means on the inspection device may be used to define a test chamber and a pressure balancing chamber. Pipeline fluid is directed to these chambers from a passageway opening to a region external of the pig so that each chamber will normally be at the same pressure. A pressure drop normally occurs in each chamber when the chamber is exposed to a leak so that fluid flows out of the chamber. If only a test pressure chamber were used, as in the prior art, the passing of the first cup over an obstruction would cause fluid to flow out of this chamber, thus causing a pressure drop in the chamber which might be interpreted as a leak. By providing a pressure balancing chamber adjacent to the test pressure chamber, and sensing the pressure in the test chamber as the cup or other means which divides the two pressure chambers passes over an obstruction, no pressure drop occurs in the test chamber since the dividing means lies between the two chambers which are at substantially the same pressure.

Applicant solves the problem of eliminating erroneous indications of leaks caused by substantial changes in pipeline diameters by the use of standard mechanical calipers mounted on the inspection pig to record the inner diameter of the pipeline as the pig passes through the pipeline. By recording simultaneously both pressure changes in the test chamber and change of diameter of the pipeline, the presence of actual leaks can more accurately be determined.

Applicant solves the problem of eliminating erroneous indications of leaks caused by minor flows of fluid through passages in the pig not caused by pipeline leaks by providing a filter means in the fluid passageway to said test chamber which entirely prevents minor fluid flows in such passageway.

An object of this invention is to provide an inspection apparatus having a plurality of pressure chambers for detecting reliably leaks in buried pipeline.

Another object of this invention is to provide an inspection pig which can distinguish between pressure differentials and fluid flows indicative of true pipeline leaks and false indications of leaks caused by pipeline obstructions, by changes in the inner diameter of the pipeline, or by minor fluid flows not caused by true pipeline leaks.

Other objects will be apparent from the drawings, the specification and the claims.

BRIEF DESCRIPTION OF THE DRAWINGS

In the drawings wherein like reference numerals indicate like parts and wherein the illustrative embodiments of this invention are shown:

FIG. 1 is a view partly in section and partly in elevation of a pipeline inspection apparatus embodying the invention in place within the pipeline;

FIG. 2 is a cross-sectional view taken along line 2—2 of FIG. 1;

FIG. 3 is a cross-sectional view taken along line 3—3 of FIG. 1;

FIG. 4 is a cross-sectional view taken along line 4—4 of FIG. 1;

FIG. 5 is a view in elevation of a strip chart recording showing the record made by a true pipeline leak;

FIG. 6 is a view in elevation of a strip chart recording showing the record made by a dent in the pipeline;

FIG. 7 is a view in elevation of a strip chart recording showing the record made by a weld in the pipeline;

FIG. 8 is a view in elevation of a strip chart recording showing the record made by an increase in inner diameter in the pipeline.

DESCRIPTION OF THE PREFERRED EMBODIMENTS

FIG. 1 shows an inspection apparatus or pig embodying the invention and adapted to travel through the pipeline PL in the direction indicated by the arrows 10. The apparatus includes two sections: a module 12 housing a recorder and power supply at the downstream end and a module 14 supporting certain inspection components at the upstream end. The two sections 12 and 14 are joined together in tandem by a U-joint 16 which enables the apparatus to negotiate relatively sharp bends in the pipeline. Although the preferred embodiment of this invention is shown to have two sections 12 and 14, clearly the apparatus could be constructed as a single unit structured about a single support.

The module 14 comprises a support 18 formed by a cylindrical body positioned substantially coaxially with the pipeline axis. Affixed by welding or other suitable means to each end of the support 18 are circular support plates 18a which function primarily to support flexible cups 20 and 22 having their peripheral edges engaging the inner surface of pipeline PL. Fluids act against these cups to propel the pig through the pipeline.

The module 12 comprises a housing 19 formed by a hollow cylindrical body for carrying a standard strip chart recorder and a power supply. Attached to the upstream end of housing 19 by welding or other suitable means is support plate 19a. A second circular plate 19b is removably securable to the downstream end of housing 19 by suitably matching threads. Plates 19a and 19b function primarily to support cups 21 and 23 which have their peripheral edges engaging the inner surfaces of pipeline PL. Pipeline fluids also act against cups 21 and 23 to propel the pig through the pipeline.

A test pressure chamber 24 is defined by the region between cups 20 and 22 outside of support 18. Thus, cups 20 and 22 may be referred to as a means for defining said test chamber 24. In order to conduct fluid into said test chamber 24 from a region 25 external of said support 18, a communicating means comprising passageways 26 and 28 is provided. Debris in fluids passing from region 25 through passageway 26 are filtered by a screen 32 in order to prevent clogged passageways.

When the test chamber 24 encounters a leak in the pipeline PL such as hole H, fluid will flow out of test chamber 24 through the defect in pipeline causing the leak, thus causing a decrease in pressure in test chamber 24 relative to the pressure in upstream region 25. In order to detect this pressure change, a differential pressure measuring means 34 is provided which measures the pressure differential between the region 25 upstream of the pig and test chamber 24 and generates a signal (DP) indicative of said differential pressure. In the preferred embodiment, a standard differential pressure device, such as the Wiancko, model P1951, may be mounted in the upstream end of support 18 having fluid pressure inputs from either side of cup 20 from region 25 and test chamber 24.

In order to prevent substantial pressure changes in test chamber 24 when flexible cup 22 traverses an obstruction in the pipeline such as a weld or dent which causes the cup to be deformed such that it loses contact with the inner wall of the pipeline, a pressure balancing chamber 36 is provided between the upstream flexible cup 21 of the module 12 and the downstream cup 22 of the module 14.

Fluids are communicated to said pressure balancing chamber 36 from region 25 upstream of said apparatus by passageway 26, aligned ports 26a in support plates 18a and annular opening 22a in cup 22. Pipeline fluids may escape the pressure balancing chamber 36 via aligned ports 19p in plate 19a and ports 21a in cup 21 into annular region 42 surrounding the recorder and power supply housing 19 and bounded by flexible cups 21 and 23 which engage the interior pipeline wall.

In actual operation, as the downstream cup 22 of said test chamber 24 encounters an obstruction in the pipeline such as weld W, cup 22 will often be deformed and become disengaged from the pipeline wall temporarily such that fluids may flow from the test chamber 24 to the pressure balancing chamber 36. By maintaining pressure balancing chamber 36 at substantially the same pressure as test chamber 24, any deformation of flexible cup 22 will not cause fluids to flow between the two chambers and thus no pressure differential is detected by differential pressure device 34. Thus, by having two adjacent pressure chambers at substantially the same pressure, pipeline obstructions do not cause substantial fluid flows and pressure differentials which may be interpreted erroneously as caused by pipeline leaks.

It is desired to prevent relatively minor fluid flows from test chamber 24 since such flows are not indicative of pipeline leaks. Therefore, a means for inhibiting the flow of fluid which enters test chamber 24 through passageway 28 is provided by way of a flapper valve 47. The valve 47 is biased by a spring such that the valve in normal position completely closes passageway 28, thus preventing any fluid flow therethrough. Only when the fluid pressure in passageway 28 is greater than the sum of the forces of the pressure in test chamber 24 and the force of the valve spring does valve 47 open, allowing the flow of fluid through passageway 28 to test chamber 24. A standard electronic switch 48 is activated by a finger 49 on valve 47 when valve 47 is in the closed position. Switch 48 generates a signal (denoted V) which is indicative of the open or closed position of valve 47.

When the inspection device traverses a pipeline region in which there is a substantial change in internal diameter of the pipeline, a pressure differential will be detected by sensor 34 which might be interpreted as a pipeline leak. In order to prevent the interpretation of pressure differentials caused by pipeline diameter changes as caused by true pipeline leaks, a means for measuring the inner diameter of the pipeline is provided by mechanical calipers 50. These calipers include levers 51 pivotally mounted to support 18 which are urged against the inner wall of the pipeline by suitable springs. Signals (denoted ID) which are indicative of the position of the caliper levers 51 are generated by standard magnetic field sensors 52 which are attached to support 18 by support arms 54 in the vicinity of magnets 56 which are mounted on the caliper levers 51. The signals from each sensor 52 may be input to a standard averaging amplifier 53 for providing a signal (denoted ID-AVG) indicative of the average inner diameter of the pipeline.

In order to provide for improved reliability in the interpretation of changing fluid flows and pressure conditions which may be caused by leaks, a means for measuring the flow of fluids into test chamber 24 via passageway 28 is provided by standard flowmeter 58. The flowmeter 58 generates a signal (denoted F) proportional to the rate of fluid flow and adds another parameter which is available to aid in interpreting conditions which may be indicative of pipeline leaks.

A means for measuring the longitudinal distance traveled by the inspection pig is provided by wheel odometer 60. The odometer 60 comprises a wheel 62 rotatably mounted on a support arm 64 which is biased into contact with the inner wall of the pipeline by spring means attached to support 18. One end of support arm 64 is pivotally mounted on support 18. The distance measured by the odometer is determined by magnetic sensor 66 which generates a signal (denoted ODOM) indicative of the strength of the magnetic field created by a magnet 68 which is mounted on the side of wheel 62.

A means for recording the signals produced by the differential pressure sensor 34, switch 48, flowmeter 58, inner diameter caliper sensors 52, inner diameter averaging amplifier 53 and odometer sensor 66 is provided in a standard strip chart recorder 70 which may be housed in module 12 together with a power supply necessary for the various components of the inspection pig. Examples of records made by recorder 70 are shown in FIGS. 5, 6, 7, 8.

FIG. 5 shows the signals recorded for an actual pipeline leak. As seen in the figure, as the downstream cup 22 of the inspection pig traverses the leak, the pressure in test chamber 24 drops relative to the pressure in region 25 upstream of the pig. When the differential pressure (DP) reaches a predetermined magnitude, flapper valve 47 (V) opens allowing fluid to flow (F) through passageway 28 into chamber 24. When cup 20 traverses the leak, the pressure differential and flow return to zero while the valve returns to its normal closed position.

The signals recorded when a pipeline dent is encountered are shown in FIG. 6. When downstream cup 22 traverses the dent, the volume of fluid in test chamber 24 decreases causing a corresponding increase in pressure in test chamber 24 relative to region 25 upstream of the pig. The dent causes one caliper 50 to register a decrease in inner diameter (ID) of the pipeline, thus causing a decrease in the signal indicating average inner diameter (ID-AVG). When the upstream cup 20 traverses the dent, the volume in test chamber 24 increases, causing a temporary decrease in differential pressure and allowing a small amount of fluid to flow into test chamber 24 via passageway 28 which flow is detected by flowmeter 58 and switch 48.

The recording of the occurrence of a weld is shown in FIG. 7. When downstream cup 22 traverses weld W, a small increase in pressure in test chamber 24 relative to region 25 upstream of the pig and then a decrease to original pressure is detected by sensor 34. Immediately thereafter, each of the calipers 50 traverse the weld and simultaneously generates a signal (ID) indicative of a small inner diameter increase. When cup 20 traverses the weld, the pressure in test chamber 24 relative to the pressure in region 25 undergoes a brief decrease and then an increase to normal condition. The lower pressure in test chamber 24 causes fluid to flow in through passageway 28 thus causing flowmeter 58 to register a small flow and causing valve 47 to open for a brief period of time.

The recording made of a pipeline which has an increase in diameter, which might occur normally at a joint where sections of pipe are welded together, is shown in FIG. 8. As downstream cup 22 of the inspection apparatus traverses the weld, pressure sensor 34 detects an instantaneous increase in pressure in test chamber 24 relative to region 25 and then a decrease until upstream cup 20 passes over the weld. The decrease in pressure in test chamber 24 causes fluid to flow into said chamber through passageway 28 thus causing valve 47 to open and flowmeter 58 to register fluid flow. When the differential pressure returns to zero, the flow through passageway 28 ceases and valve 47 closes. In all of FIGS. 5, 6, 7, and 8, the signal from odometer magnetic sensor 66 is recorded indicating the longitudinal distance traveled by the inspection device.

Thus, an inspection pig for reliably detecting pipeline leaks has been described in accordance with the preferred embodiment shown herein.

The foregoing disclosure and description of the invention are illustrative and explanatory thereof and various changes in the size, shape, and materials, as well as in the details of the illustrated construction may be made within the scope of the appended claims without departing from the spirit of the invention.

I claim:

1. An apparatus for inspecting a pipeline for leaks, comprising:
  a support, said support movable through said pipeline;
  means mounted on said support for defining a test chamber which is exposed to the inner wall of the pipeline to be inspected as the support moves therethrough;
  first means for selectively communicating pipeline fluid from a region in said pipeline in the vicinity of but external of said inspection apparatus to said test chamber so that fluid pressure is exerted against the inner wall of the pipeline in said chamber, whereby fluid in said chamber will escape through any pipeline deformity which is a source of a pipeline leak;
  means for measuring the differential in pressure between said test chamber and said region so that fluids leaking from said chamber will cause a change in said differential pressure which may be indicative of pipeline leaks, said pressure differential measuring means generating a signal indicative of the magnitude of said pressure differential;
  means connected to said support for defining a pressure balancing chamber, said test and pressure balancing chambers being adjacent to each other and divided by resilient means which yieldably engages the inner wall of the pipeline when in its normal position and deformable by pipeline obstructions to establish communication between said test and pressure balancing chambers; and
  second means for communicating pipeline fluid from said region external said inspection apparatus to said pressure balancing chamber whereby said test and pressure chambers are normally maintained at the same pressure so that the traversal of a pipeline obstruction by said resilient means which causes said resilient means to become disengaged from the interior of said pipeline will not cause fluid loss from said test chamber which might be interpreted erroneously as caused by a pipeline leak.

2. The apparatus of claim 1 including means connected to said support for measuring the internal diameter of the pipeline, said means generating a signal whose magnitude is indicative of the diameter of the pipeline.

3. The apparatus of claim 1 including a means for inhibiting fluids from flowing through said first communicating means to said test pressure chamber to prevent minor fluid flow therethrough.

4. The apparatus of claim 3 wherein said inhibiting means comprises a flapper valve which blocks the flow of fluids through said first communicating means until the pressure in said first communicating means exceeds the combined force of the valve and the force exerted by the fluid in said first pressure chamber.

5. The apparatus of claim 1 including a means for measuring the flow of fluids through said first communicating means, said flow measuring means generating a signal indicative of said fluid flow.

6. The apparatus of claim 5 including means for generating a signal indicative of the longitudinal distance traveled by said inspection apparatus through said pipeline.

7. The apparatus of claim 6 wherein said distance signal means comprises:
an odometer wheel rotatably mounted on a support arm pivotally connected to said support;
spring means biasing said wheel into contact with the inner wall of the pipeline;
a magnet mounted on the side of said wheel so that the magnet defines a circular path as the wheel turns; and
magnetic field sensor means mounted on the support arm for sensing each revolution of the magnet on said wheel.

8. The apparatus of claim 7 including a means for recording said pressure differential signal, said distance signal, and said fluid flow signal whereby said record later can be interpreted for the presence of leaks in the pipeline.

9. An apparatus for inspecting pipeline for leaks, comprising:
a support, said support movable through a pipeline;
a test chamber defined by two annular flexible cups attached to said support, each of said cups engaging the inner wall of the pipeline in order substantially to block the flow of fluids thereby, the interior of which is exposed to a section of the inner wall of said pipeline as the support moves therethrough;
first means for selectively communicating pipeline fluid from a region within said pipeline in the vicinity of but outside said apparatus to said test chamber means so that fluid pressure in said test chamber is exerted against the pipeline wall;
a pressure balancing chamber adjacent said test chamber, said pressure balancing chamber defined by the downstream cup of said test chamber and a third annular flexible cup supported on said support, said third cup engaging the inner wall of the pipeline in order substantially to block the flow of fluids thereby;
a second means for communicating fluid from said region outside said apparatus to said pressure balancing chamber whereby said test and pressure balancing chambers are normally maintained at substantially the same pressure; and
means for measuring the pressure differential between said test chamber and said region outside said apparatus, said pressure differential measuring means generating a signal indicative of the magnitude of said pressure differential.

10. The apparatus of claim 9 including means connected to said support for measuring the internal diameter of the pipeline, said means generating a signal whose magnitude is indicative of the diameter of the pipeline.

11. The apparatus of claim 10 including means for inhibiting the flow of fluid through said first communicating means to said test chamber to prevent minor flows therethrough, said inhibiting means generating a signal indicative of whether said inhibiting means is open or closed,
a magnetic field sensor mounted on said support in close proximity to said magnet for sensing the spatial distance between said magnet and said sensor which generates a signal indicative of the inner diameter of the pipeline.

12. The apparatus of claim 11 including means for measuring the flow of fluid through said first communicating means to said test chamber, said flow measuring means generating a signal indicative of such fluid flow.

13. The apparatus of claim 12 including means for measuring the longitudinal distance traveled by said apparatus within said pipeline, said distance measuring means generating a signal indicative of the distance traveled by said apparatus.

14. The apparatus of claim 12 wherein said internal diameter measuring means comprises:
a support arm pivotally mounted to said support and biased into engagement with side pipeline by spring means;
a magnet mounted on said support arm;
a magnetic field sensor mounted on said support in close proximity to said magnet for sensing the spatial distance between said magnet and said sensor which generates a signal indicative of the inner diameter of the pipeline.

15. The apparatus of claim 14 wherein the inhibiting means is a flapper valve.

16. The apparatus of claim 15 wherein said distance measuring means comprises:
an odometer wheel rotatably mounted on a support arm pivotally connected to said support;
spring means biasing said wheel into contact with the inner wall of the pipeline;
a magnet mounted on the side of said wheel so that the magnet defines a circular path as the wheel turns; and
second magnetic field sensor means mounted on the odometer support arm for sensing each revolution of the magnet on said wheel and generating a signal responsive thereto.

17. The apparatus of claim 16 including a recorder for plotting the signals generated by said differential pressure measuring means, said flow measuring means, said inhibiting means, said inner diameter measuring means, and said distance measuring means.

* * * * *